United States Patent
Bshara et al.

(10) Patent No.: US 11,843,434 B2
(45) Date of Patent: Dec. 12, 2023

(54) MILLIMETER WAVE COARSE BEAMFORMING USING OUTBAND SUB-6GHZ RECONFIGURABLE ANTENNAS

(71) Applicant: Drexel University, Philadelphia, PA (US)

(72) Inventors: Oday Bshara, Philadelphia, PA (US); Vasil Pano, Philadelphia, PA (US); Md Abu Saleh Tajin, Philadelphia, PA (US); Kapil R. Dandekar, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 52 days.

(21) Appl. No.: 17/213,930

(22) Filed: Mar. 26, 2021

(65) Prior Publication Data

US 2021/0306042 A1    Sep. 30, 2021

Related U.S. Application Data

(60) Provisional application No. 63/000,271, filed on Mar. 26, 2020.

(51) Int. Cl.
| | |
|---|---|
| *H04B 7/0456* | (2017.01) |
| *H04B 7/06* | (2006.01) |
| *H04W 16/28* | (2009.01) |
| *H04B 7/0491* | (2017.01) |

(52) U.S. Cl.
CPC ......... *H04B 7/0617* (2013.01); *H04B 7/0456* (2013.01); *H04B 7/0491* (2013.01); *H04B 7/0695* (2013.01); *H04W 16/28* (2013.01)

(58) Field of Classification Search
CPC .. H04B 7/0617; H04B 7/0456; H04B 7/0695; H04B 7/0491; H04B 7/024; H04B 7/088; H04B 7/0452; H04W 16/28; H04L 5/0035; H04L 5/0051; H04L 5/0058
USPC ......................................... 370/329, 331, 336
See application file for complete search history.

(56) References Cited

U.S. PATENT DOCUMENTS

| | | | | |
|---|---|---|---|---|
| 2018/0098330 | A1* | 4/2018 | Nguyen | G06N 20/00 |
| 2018/0375707 | A1* | 12/2018 | Bala | H04L 27/2605 |
| 2019/0319693 | A1* | 10/2019 | Ciochina | H04B 7/0452 |
| 2021/0126684 | A1* | 4/2021 | Chen | H04W 16/28 |

(Continued)

OTHER PUBLICATIONS

Stephen Wolfe, Adaptive Link Optimization for 802.11 UAV Uplink Using A Reconfigurable Antenna, Jun. 2017, Drexel University (Year: 2017).*

(Continued)

*Primary Examiner* — Harun Chowdhury
(74) *Attorney, Agent, or Firm* — Schott, PC.

(57) ABSTRACT

Low latency beamforming using phased antenna arrays is the key for practical deployment of envisioned millimeter wave (mmWave) Gbps mobile networks. This work aims towards reducing the overhead of the exhaustive sector-level sweep phase of the analog beamforming adopted in the IEEE 802.11ad standard. This system uses a reconfigurable antenna single RF chain in the sub-6 GHz new radio (NR) band to aid codebook-based beam selection in the mmWave band of the NR. The system exploits the congruence between the spatial propagation signatures of signals at both mmWave and sub-6 GHz frequencies to reduce the beam search space.

17 Claims, 16 Drawing Sheets

(56) References Cited

U.S. PATENT DOCUMENTS

| | | | | |
|---|---|---|---|---|
| 2021/0258053 | A1* | 8/2021 | Göransson | H04W 16/28 |
| 2022/0123971 | A1* | 4/2022 | Malek-Mohammadi | H04B 7/0617 |

OTHER PUBLICATIONS

Daniel Rodrigo, Reconfigurable Pixel Antennas for Communications, Apr. 2013, Universitat Politecnica de catalunya (Year: 2013).*

I. A. Hernadeh, K. Satyanarayana, M. El-Ha jjar, and L. Hanzo. Millimeter-Wave Communications: Physical Channel Models, Design Considerations, Antenna Constructions, and Link-Budget. IEEE Communications Surveys Tutorials, 20(2):870-913, Secondquarter 2018.

X. Wang, L. Kong, F. Kong, F. Qiu, M. Xia, S. Amon, and G. Chen. Millimeter Wave Communication: A Comprehensive Survey. IEEE Communications Surveys Tutorials, 20(3): 1616-1653, thirdquarter 2018.

T. S. Rappaport, S. Sun, R. Mayzus, H. Zhao, Y. Azar, K. Wang, G. N. Wong, J. K. Schulz, M. Sarnirni, and F. Gutierrez. Millimeter Wave Mobile Communications for 5G Cellular: It Will Work! IEEE Access, 1:335-349, 2013.

T. Baykas, C. Sum, Z. Lan, J. Wang, M. A. Rahman, H. Harada, and S. Kato. IEEE 802.15.3c: the first IEEE wireless standard for data rates over 1 GB/s. IEEE Communications Magazine, 49(7):114-121, Jul. 2011.

B. D. Van Veen and K. M. Buckley. Beamforrning: a versatile approach to spat ial filtering. IEEE ASSP Magazine, 5(2):4-24, Apr. 1988.

J. Wang, Z. Lan, C. Sum, C. Pyo, J. Gao, T. Baykas, A. Rahman, R. Fu-nada, F. Kojima, I. Lakkis, H. Harada, and S. Kato. Beamforming Code-book Design and Performance Evaluation for 60GHz Wideband WPANs. In 2009 IEEE 70th Vehicular Technology Conference Fall, pp. 1-6, Sep. 2009.

W. Roh, J. Seol, J. Park, B. Lee, J . Lee, Y. Kim, J. Cho, K. Cheun, and F. Aryanfar. Millimeter-wave bearnforming as an enabling technology for 5G cellular communications: theoretical feasibility and prototype results. IEEE Communications Magazine, 52(2):106-113, Feb. 2014.

Tong He and Zhenyu Xiao. Suboptimal beam search algorithm and code-book design for millimeter-wave communications. Mobile Networks and Applications, 20(1):86-97, Feb. 2015.

A. Klauta u, P. Batista, N. Gonzalez-Prelcic, Y. Wang, and R. W. Heath . 5G MIMO Data for Machine Learning: Application to Beam-Selection Using Deep Learning. In 2018 Information Theory and Applications Workshop (ITA), pp. 1-9, Feb. 2018.

V. Va, J. Choi, T. Shimizu, G. Bansal, and R. W. Heath. Inverse Multipath Fingerprinting for Millimeter Wave V2I Beam Alignment. IEEE Transactions on Vehicular Technology, 67(5):4042-4058 , May 2018.

M. Hashemi, C. E. Koksal, and N. B. Shroff. Out-of-Band Millimeter Wave Beamforming and Communications to Achieve Low Latency and High Energy Efficiency in 5G Systems. IEEE Transactions on Communications, 66(2):875-888, Feb. 2018.

N. Gonzalez-Prelcic, R. Mendez-Rial, and R. W. Heath . Radar aided beam alignment in MmWave V2I communications supporting antenna diversity. In 2016 Information Theory and Applications Workshop (ITA), pp. 1-7, Jan. 2016.

J. Mo, B. L. Ng, S. Chang, P. Huang, M. N. Kulkarni, A. Alammouri, J.C. Zhang, J. Lee, and W. Choi. Beam Codebook Design for 5G mmWave Terminals. IEEE Access, 7:98387-98404, 2019.

Z. Xiao, T. He, P. Xia, and X. Xia. Hierarchical Codebook Design for Beamforrning Training in Millimeter-Wave Communication. IEEE Trans-actions on Wireless Communications, 15(5):3380-3392, May 2016.

Wireless Insite https://www.remcom.com/wireless-insite-em-propagation-software. Last accessed May 24, 2021.

Gek Hong Sim, Sabrina Klos, Arash Asadi, Anja Klein, and Matthias Rollick. An Online Context-Aware Machine earning Algorithm for 5G mmWave Vehicular Communications. IEEE/ACM Trans. Netw., 26(6):2487-2500, Dec. 2018.

A. Klautau, N. Gonzalez-Prelcic, and R. W. Heath. LIDAR Data for Deep Learning-Based mmWave Beam-Selection. IEEE Wireless Communications Letters, 8(3):909-912, Jun. 2019.

M. Dias, A. Klautau, N. Gonzalez-Prelcic, and R. W. Heath. Position and LIDAR-Aided mmWave Beam Selection using Deep Learning. In 2019 IEEE 20th International Workshop on Signal Processing Advances in Wire-less Communications (SPAWC), pp. 1-5, Jul. 2019.

Deyou Zhang, Ang Li, Mahyar Shirvanimoghaddam, Peng Cheng, Yonghui Li, and Branka Vucetic. Codebook-based t raining beam sequence design for millimeter-wave tracking systems. IEEE Transactions on Wireless Communications, 18(11):5333-5349, 2019.

A. Ali, N. Gonzalez-Prelcic, and R. W. Heath. Estimating millimeter wave channels using out-of-band measurements. In 2016 Information Theory and Applications Workshop (ITA ), pp. 1-6, Jan. 2016.

T. Nitsche, A. B. Flores, E. W. Knightly, and J. Widmer. Steering with eyes closed: Mm-Wave beam steering without in-band measurement. In 2015 IEEE Conference on Computer Communications (INFOCOM), pp. 2416-2424, Apr. 2015.

Yoora Kim, Kyunghan Lee, and Ness B. Shroff. An Analytical Framework to Characterize the Efficiency and Delay in a Mobile Data Offloading System. In Proceedings of the 15th ACM International Symposium on Mobile Ad Hoc Networking and Computing, MobiHoc '14, pp. 267-276, New York, NY, USA, 2014. ACM.

IEEE Standard for Infor mation technology—Telecom-municationsand infor-mation exchange between systems—Local and metropolit an area networks—Specific requirements—Part 11: Wireless LAN Medium Access Control (MAC) and Physical Layer (PHY) Specifications Amendment 3: Enhancements for Very High Throughput in the 60 GHz Band. IEEE Std 802.11ad—2012 (Amendment to IEEE Std 802.11-2012, as amended by IEEE Std 802.11ae-2012 and IEEE Std 802.11aa-2012), pp. 1-628, Dec. 2012.

J. Zhang, Y. Huang, Q. Shi, J. Wang, and L. Yang. Codebook Design for Beam Alignment in Millimeter Wave Communication Systems. IEEE Transactions on Communications, 65(11):4980-4995, Nov. 2017.

Jianhua Mo, Boon Loong Ng, Sanghyun Chang, Pengda Huang, Mandar N. Kulkarni, Ahmad Alammouri, Jianzhong Charlie Zhang, Jeongheum Lee, and Won-J oon Choi. Beam Codebook Design for 5G mmWave Terminals. IEEE Access, 7:98387-98404, 2019.

Junyi Wang, Zhou Lan, Chang-woo Pyo, T. Baykas, Chin-sean Sum, M. A. Rahman, Jing Gao, R. Funada, F. Kojima, H. Harada, and S. Kato. Beam codebook based beamforming protocol for multi-Gbps millimeter-wave WPAN systems. IEEE Journal on Selected Areas in Communications, 27(8):1390-1399, Oct. 2009.

K. Sa.tyanarayana., M. El-Ha jjar , P. Kuo, A. Mourad, and L. Hanzo. Mil-limeter Wave Hybrid Beamforming with DFT-MUB Aided Precoder Code-book Design. In 2017 IEEE 86th Vehicular Technology Conference (V T C—Fall), pp. 1-5, Sep. 2017.

D. J. Love, R. W. Heat h, and T. Strohmer. Grassmannian beamforming for multiple-input multiple-output wireless systems. IEEE Transactions on Information Theory, 49(10):2735-2747, Oct. 2003.

Nitin Jona.than Myers, Amine Mezghani, and Robert W. Heath. FALP: Fast beam alignment in mmWave systems with low-resolution phase shifters. IEEE Transactions on Communications, p. 1-1, 2019.

Ang Li, Christos Masouros, and Mathini Sella.thurai. Analog-Digital Beam-forming in t he MU-MISO Downlink by Use of Tunable Antenna Loads. IEEE Transactions on Vehicular Technology,67(4):3114-3129, 2018.

J. Costantine, Y. Tawk, S. E. Barbin, and C. G. Christ odoulou. Reconfigurable Antennas: Design and Applications. Proceedings of the IEEE, 103(3):424-437, Mar. 2015.

N. Gulati and K. R. Dand ekar. Learning State Selection for Reconfigurable Antennas: A Multi-Armed Bandit Approach. IEEE Transactions on Antennas and Propagation, 62(3):1027-1038, Mar. 2014.

D. Patron and K. R. Dandekar. Planar reconfigurable antenna with integrated switching control circuitry. In the 8th European Conference on Antennas and Propagation (EuCAP 2014), pp. 2737-2740, Apr. 2014.

(56) References Cited

OTHER PUBLICATIONS

Md Abu Saleh Tajin and Kapil R. Dandekar. On the Design of Pattern Reconfigurable Alford Loop Antennas. In 2021 International Conference on Electromagnetics in Advanced Applications (ICEAA), pp. 197-202, 2021.

T. R. Rao, D. Murugesan, S. Ramesh, and V. A. Labay. Radio channel characteristics in an indoor corridor environment at 60 GHz for wireless networks. In 2011 Fifth IEEE International Conference on Advanced Telecommunication Systems and Networks (ANTS), pp. 1-5, Dec. 2011.

B. Li, Z. Zhou, W. Zou, X. Sun, and G. Du. On the Efficient Beam-Forming Training for 60GHz Wireless Personal Area Networks. IEEE Transactions on Wireless Communications, 12(2):504-515, Feb. 2013.

\* cited by examiner (a) TX2.

(b) TX3.

(c) TX4.

(a) TX3 32 × 32.

(b) TX3 64 × 64.

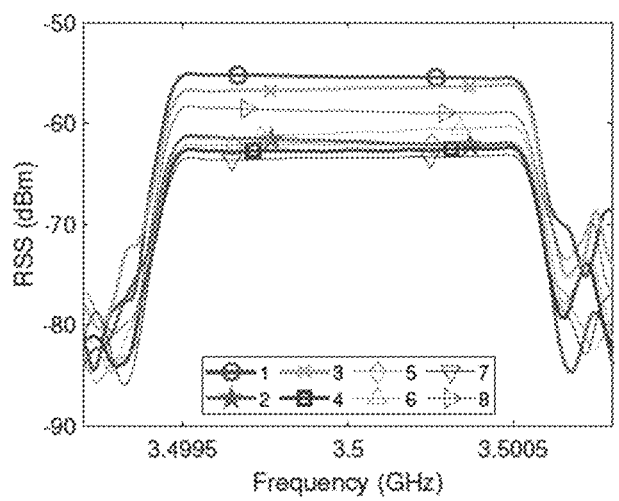
FIG. 14 (a) RX1 LOS
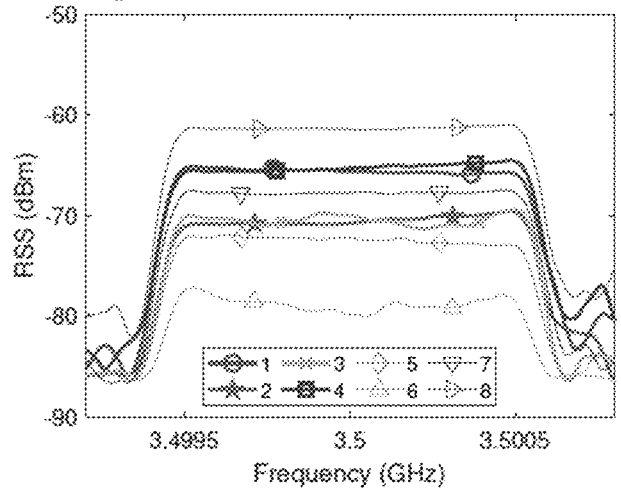
FIG. 14 (b) RX2 LOS
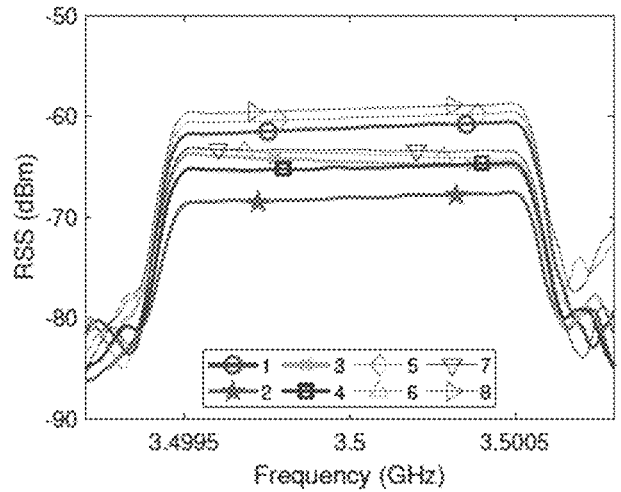
FIG. 14 (c) RX3 LOS

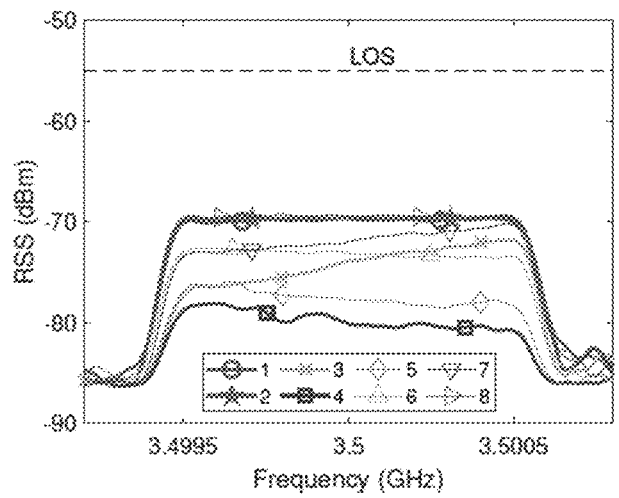
FIG. 14 (d) RX1 Blocked
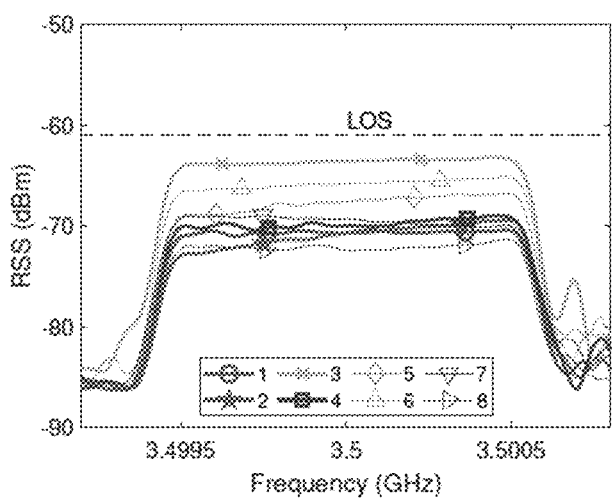
FIG. 14 (e) RX2 Blocked

FIG. 14 (f) RX3 Blocked

Table 1 Ray Tracing Parameters

| Parameter | Value |
|---|---|
| Software | Remcom Ray Tracing |
| Frequency | 60 GHz (3.5 GHz) |
| Transmit Power | 40 dBm (30 dBm) |
| Antenna | Half Dipole (Reconfigurable Antenna) |
| RX | Grid of 6×30 at height 1.5m |
| TX | 5 points at height 7m |
| Number of paths | 25 |

Table 2 Simulation Building Material Properties

| | Permittivity | Conductivity | Thickness |
|---|---|---|---|
| Concrete | 15 | 0.015 | 0.3m |
| Brick | 4.44 | 0.001 | 0.125m |

Table 3 Comparing proposed solution to others

| Ref | Solution | Outband aided/Standalone | RF chains at sub-6GHz | Notes |
|---|---|---|---|---|
| [8] | Hierarchical Beamforming | Standalone | NA | |
| [16] | Context Based Beamforming | Standalone | NA | LTE network passes context data to BS |
| [10] | Inverse Multipath Fingerprint | Standalone | NA | |
| [11] | Correlation with sub-6GHz | Outband | Multiple (8) | |
| [12] | Radar aided beamforming | Outband | NA | Radar system works at mmWave band also |
| This work | Reconfigurable Antenna | Outband | Single | Applicable to handheld devices |

FIG. 17

MILLIMETER WAVE COARSE BEAMFORMING USING OUTBAND SUB-6GHZ RECONFIGURABLE ANTENNAS

STATEMENT REGARDING GOVERNMENT SUPPORT

This invention was made with government support under Contract No. 1828236 awarded by the National Science Foundation. The government has certain rights in the invention.

BACKGROUND

1. Background and Related Work

The importance of reducing the overhead of beam scanning in mmWave communication has motivated researchers to develop a variety of different solutions. Some approaches found an improvement through techniques that make use of the data communication band at mmWave frequencies and others proposed benefiting from the propagation characteristics of other frequency bands.

1.1 Stand-Alone mmWave In-Band Beamforming

This subsection focuses on the scenarios where the data communication happens at mmWave band frequencies and the beamforming process benefits solely from this band of frequencies.

Hierarchical Beamforming: The multi stage beamforming concept has been applied in various codebook designs implemented in DFT codebooks where multiple beams of adjacent phase shifts are summed up to generate wider beams for initial phase(s) of beam scanning. Another implementation route designs the codebook to be hierarchical. The design sorts the beams into layers where each beam at a particular layer is wide enough to cover two adjacent beams in the deeper layer of the codebook. Deactivating elements of the antenna array is the author's way to generate wide beams while sacrificing the high gain requirement.

Some previous solutions solve the gain loss due to the deactivation of antenna elements for varying the generated beam widths. Alternatively, they suggest a sub-array activation system to make up for the gain loss where the codewords either have all the antenna elements activated, or have half of them activated. The proposed technique described herein may use the out-band solution (See Section 1.2), which allows the activation of all antennas while reducing the codebook scanning overhead.

Context Based Beamforming: Other solutions use Wireless Insite data along with a traffic simulator to generate data that can be used to train machine-learning applications in 5G. Cars and blockage are placed randomly in the simulation environment. Point-to-point ray tracing data is collected from the Wireless Insite ray tracing simulator. A Uniform Planar Array (UPA) geometric model is imposed to the ray tracing data to generate the channel matrix for mmWave antenna arrays evaluation. Some solutions apply deep reinforcement learning to maximize the users rewards over time. And others provide a generalized method to use the contextual information for beamforming in 5G mmWave vehicular networks by proposing a lightweight online learning algorithm and providing upper bound on the regret (i.e. the loss of learning). Still others use the LTE network running side by side with the mmWave systems in order to pass the user's contextual data to the base station, where the base station applies the multi-arm bandit machine learning algorithm for optimal beam selection for a given context as cars keep connecting to the base station.

Another approach addresses vehicular scenarios and proposed a distributed architecture where the base station broadcasts its position. The connected vehicle leverages its light detection and ranging (LIDAR) data to suggest a set of beams selected via deep convolutional neural network (CNN). The vehicle uses LIDAR data and its position along with the broadcasted base station (BS) position to estimate a set of candidate beam pairs that are passed to the BS through the control channel that uses low frequency. The results showed that beam selection overhead can be reduced by 12 times in line of sight (LOS) and 2 times in non line of sight (NLOS) scenarios. Some have also used machine learning (ML) based on LIDAR data for LOS detection that supports beam selection.

Inverse Multipath Fingerprint Solution: Some approaches propose using the location of the vehicle to query a multipath fingerprint database for potential pointing directions for reliable beam alignment. Such approaches may benefit from the fingerprinting localization where a multipath signature is compared to the fingerprint database to estimate the position. The inverse of this technique may be used to aid mmWave beamforming and reduce the beam alignment overhead.

1.2 Out-Band Beamforming

Out-band beamforming is a term that describes the technique of benefiting from other frequency bands to aid and speed up the beamforming process for the mmWave band that is used for high data rate communication. Related works include:

Correlation with sub-6 GHz: Some have studied the correlation between the angle of arrival (AoA) at mmWave and sub-6 GHz bands and discovers that 60 GHz system's AoA is +/−10 degrees the sub-6 GHz system's AoA. This finding reduces the beamforming overhead to scanning only 2 as to 180 degrees in mmWave standalone system. Sub-6 GHz system uses MIMO digital beamforming for beamforming and for data communication. Digital beamforming requires multiple RF chains which is a main difference from the proposed work, which alternatively uses the low complexity reconfigurable antennas at sub-6 GHz with a single radio frequency (RF) chain. The experimental results show high AoA correlation in LOS scenarios.

Others have also studied the correlation between mmWave frequencies and sub-6 GHz frequencies using ray tracing data and proposes two methods for translating the spatial correlation at low frequency to high frequencies. The work in [20] uses the out of band frequencies at Wifi frequency of 2.4 GHz as a detection band only where it estimates the AoA to be used by mmWave system to reduce the beam search overhead. The out-band system is implemented using eight synchronized WARP based RF chains at the node. Using eight RF chains highlights the possible cost reduction by adapting a reconfigurable antenna system that requires only one RF chain to achieve the same outcome.

Radar Aided Beamforming: One approach proposes using a radar mounted at the road infrastructure to aid in configuring the mmWave communication link in a vehicle to infrastructure (V2I) scenario by using the side information from a radar operating at a mmWave band to extract the channel information of the communication system operating at another mmWave band. Ray tracing simulation using 76.5 GHz radar band and 65 GHz communication band results confirm that the main directions of arrival (DoAs) for the radar and the communication signals are similar. The proposed technique uses lower frequencies in a low complexity system to infer the DoA of the mmWave beam.

1.3 Hybrid System Beamforming

Previous generations of communication systems continue to coexist with the new generations and 5G is not an exception. mmWave systems might have to support conventional sub-6 GHz systems as well. In this case mmWave systems will be able to benefit from the conventional frequency systems for beamforming. The conventional systems can be turned on when the mmWave system suffers a long outage. Some have analyzed the effect of human-caused blockage to infer the angle of arrival (AoA) correlation in an integrated system of both mmWave 30 GHz interface and 3 GHz interface. The integration allows reducing the mmWave beamforming overhead and functions as a fallback data transmission solution when the mmWave channel experiences long outages.

The work of some approaches studies a dual interface system to offload cellular data over Wifi network.

SUMMARY OF THE EMBODIMENTS

The described technique can be used in a hybrid manner as well where the low frequency reconfigurable antenna system can perform data transmission when the mmWave beams are totally blocked.

A system for low latency beamforming using phased antenna arrays includes a main module comprising a mmWave communicating system at high data rates that uses a codebook for high gain beamforming, where the main module is supported by a sub-6 GHz reconfigurable antenna system for coarse beamforming.

A low complexity system for low latency beamforming at mmWave frequencies comprising a high data rate mmWave communication module that uses a phased antenna array for higher gain and applies codebook based analog beamforming for spatial beam scanning; and a sub-6 GHz single RF chain coarse beamforming module that iterates over the states of a Reconfigurable Alford Loop Antenna (RALA) that is equipped with a state control circuit to provide a coarse direction of communication as a side information to the mmWave communication module to short-list the optimal beams and reduce the beam scanning overhead as a result.

A low latency low complexity mmWave beamforming system comprising a sub-6 GHz reconfigurable antenna module for coarse beamforming, wherein the sub-6 GHz antenna module uses a Reconfigurable Alford Loop Antenna (RALA) that has an integrated control circuit to switch between different antenna patterns to identify a coarse direction of communication and communicates the coarse data to a main module, wherein the main module comprising a high data rate mmWave communication system that uses a phased antenna array for higher gain, performs analog beamforming using a beamforming codebook, and uses the coarse beamforming data to identify a shortlisted beams of its codebook that has the optimum beam for communication to reduce the beam scanning overhead.

A low latency low complexity mmWave beamforming system comprising: a sub-6 GHz reconfigurable antenna module for coarse beamforming, wherein the sub-6 GHz antenna module uses a Reconfigurable Alford Loop Antenna (RALA) that has an integrated control circuit to switch between different antenna patterns to identify a coarse direction of communication and communicates the coarse data to a main module, wherein the main module comprises a high data rate mmWave communication system that uses a phased antenna array for higher gain, performs analog beamforming using a beamforming codebook, and uses the coarse beamforming data to identify shortlisted beams from its codebook that has the optimum beam for communication to reduce the beam scanning overhead.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 14(a)-(f) show RSS for human blockage scenario. RX1,2,3 correspond to RX positions as explained in FIG. 13.

FIG. 17 shows Table 3.

DETAILED DESCRIPTION OF THE EMBODIMENTS

2 Introduction

The wide swaths of contiguous spectrum available at mmWave frequencies are attractive for wireless applications that require Gbps data rates. However, mmWave frequencies experience quasioptical propagation that suffers from free space path loss and ambient attenuation caused by oxygen and water absorption. Fortunately, the short wavelength at mmWave frequencies allows for packing many antenna elements in a small aperture area to achieve high gain even for portable devices. The resulting narrow directional beam of the antenna array can be steered by controlling the phase feeding network of the antenna array by changing the antenna weight vector (AWV) of the antenna array elements to allow signals to add up constructively towards the propagation direction and destructively towards interference sources.

High gain antenna arrays comprise many antenna elements (N) and results in a large number of possible steering beams (2bN) where b is the number of bits of available choices of magnitude and phase weights for the antenna elements. For a particular time and space context, exhaustively evaluating all the possible beams is not necessary since a subset of these possible beams is sufficient to generate gain levels required for Gbps data rates. The results section below compares: (1) the exhaustive search achievable gain levels required for Gbps data rates, and (2) the exhaustive search achievable gains with the proposed solution achievable gains.

Fast selection of the best AWVs that achieve the best beam is an enabling task in mmWave communication systems. Scanning all possible beams raises the issue of latency in dynamic mobile environments where the beam alignment process should take place as frequently as the mobile user changes location or orientation. To alleviate the latency problem, many approaches try to find a subset of the beams that includes the optimal beam rather than scanning exhaustively the whole codebook of AWVs.

Figure 1:
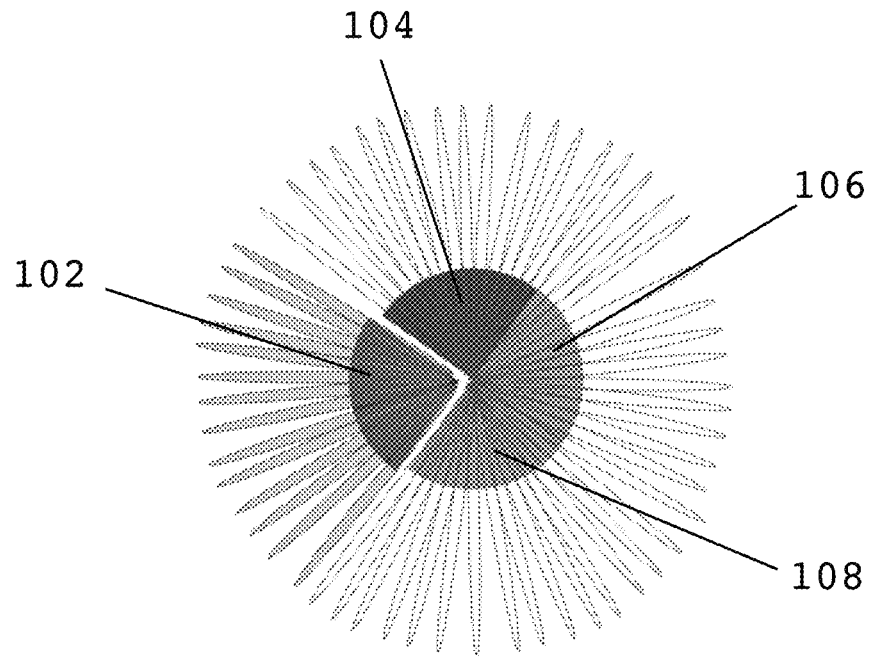
FIG. 1 shows an illustration of the proposed technique of mmWave beamforming using reconfigurable antennas.

FIG. 1 illustrates the concept of the proposed technique where the colored sectors 102, 104, 106, 108 represent the possible low frequency reconfigurable antenna patterns with each sector corresponding to a subset of the mmWave beams. As used in the concept depicted in FIG. 1, the beam-selection algorithm may search for the optimum mmWave beam in the separated (red) quadrant 102 instead of the entire beamspace. As a result, latency is significantly reduced compared to an exhaustive search.

Some features to note herein include:
- Use of a low complexity single pattern reconfigurable antenna to capture the spatial propagation between two nodes operating at sub-6 GHz.
- An integrated system that uses the spatial signature captured at sub-6 GHz as support information for a 60 GHz mmWave beamforming system in order to reduce the beam search space while selecting the optimal beam and eventually reducing the time delay overhead of the beamforming process.
- Building a simulation system for the integrated beamforming system that uses outdoor electromagnetic ray tracing data for co-located mmWave and sub-6 GHz antennas. This simulation is followed by a MATLAB post-processing script for algorithm evaluation.
- Building an algorithm that uses the spatial information gathered through the low complexity acquisition measurements to guide mmWave beam selection and compare this beam selection with state-of-the-art solutions.
- Evaluating the complexity overhead reduction performance of the proposed solution for various uniform linear array (ULA) sizes by quantifying the mmWave beamforming overhead improvement.
- Providing insights on using the integrated system to detect blockage that causes the loss of line of sight (LOS) links.

3 Algorithm Explanation

This disclosure may address the issue of initiating or maintaining a mmWave communication link. This issue can be classified into three main categories:

1. Both nodes are equipped with omnidirectional antennas, and can transmit at high power to achieve link budget requirements for Gbps data rates. This trivial method is problematic in mmWave communication due to the impractical power levels that are required, especially for portable devices.
2. Both nodes use phased-array antennas where the lower energies of the individual antennas, when combined constructively through a phase-shifting feed network, can achieve higher gain to satisfy the link budget requirements. However, the energy is directed towards a specific spatial direction. This necessitates adapting some intelligence in the antenna systems to assure that the energy is being directed towards the second node. Direction finding by exhaustively scanning a huge codebook is impractical due to the time delay in finding the correct code. However, exhaustive search can be a solution for static systems with minimal need for alignment correction (e.g. backhaul mmWave links).
3. Systems under research use phased-array antennas while aiming to reduce the time delay required to find the optimal beamforming code. While there have been many attempts to reduce the time delay overhead, the inventors believe that state-of-the-art efforts have an unnecessarily high complexity. There is thus still a crucial need for low computation and low hardware complexity solutions for practical use in mmWave antenna systems, and particularly in portable devices.

Figure 2:
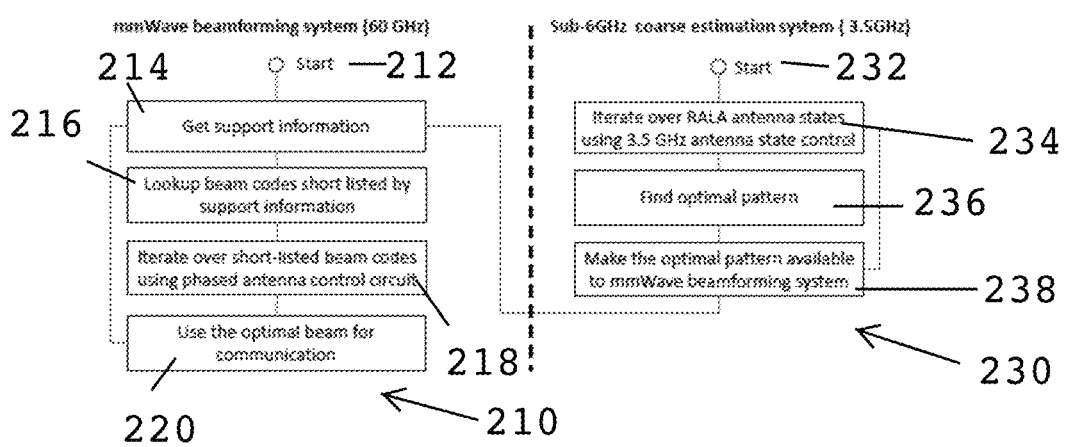
FIG. 2 shows a proposed mmWave beamforming algorithm diagram.

The algorithm that this section is titled for is shown in FIG. 2, is based on a divide-and-conquer approach that divides the mmWave communication problem into two subsystems working in parallel:

(1) High gain mmWave band communication that is achieved by using high gain directional antennas of many antenna elements 210. This subsystem is to the left of dashed line in FIG. 2 that shows a sequence of steps: start 212, get support information 214, lookup beam codes short listed by support information, 216, iterate over short-listed beam codes using phased antenna control circuit 218 and use the optimal beam for communication 220, which step feeds back to the support information 214.

(2) Intelligent sub-6 GHz system that steers the antenna array towards a coarse direction of communication 230. Without this steering, the communication is very unlikely to happen considering the typical narrow beams (e.g. 10 beam-width) of mmWave antenna systems or at best it will be impractically slow to align. This subsystem is shown at the right side of the dashed line in FIG. 2 where after a start 232, the system 230 iterates over a Reconfigurable Alford Loop Antenna (RALA) antenna states using 3.5 GHz antenna state control 234, finds an optimal pattern 236, and makes the optimal pattern available to the mmWave beamforming system 238 (and feeds that back to the support information 214.

The coarse steering system may dedicate the mmWave beamforming system only for high data rate communication along with fine tuning for precise alignment. The coarse estimate may be done by the parallel system that uses different resources from those used by the mmWave beamforming system which is made possible by using a different band of frequencies at 3.5 GHz. Thus, the system is compatible with New Radio (NR) spectrum allocations that operate in the recently licensed 3.5 GHz and 60 GHz frequency bands.

The system may use a Reconfigurable Alford Loop Antenna (RALA) as a low complexity solution for the coarse estimate of the direction of communication. This approach can be compared to other techniques that leverage conventional direction-finding techniques based on the acquisition of measurements in a digital beamforming system, where each antenna is connected to a separate RF chain which is highly impractical due to cost and complexity. The method uses a single RALA that has four microstrip elements that can be activated and deactivated through PIN diodes resulting in different antenna patterns described in section 4.3.

4 System Architecture

The envisioned system architecture may include multiple components. One component may be the mmWave communicating system at high data rates which uses a codebook for high gain beamforming. The main module may be supported by a sub-6 GHz reconfigurable antenna system for coarse beamforming. In this particular scenario, a 3.5 GHz reconfigurable antenna system runs its own state selection algorithm (e.g. exhaustive state scanning) and makes the result available to the mmWave system. The reconfigurable antenna state is the activated pattern for communication at a particular time where the optimal state is the reconfigurable antenna pattern that achieves the maximum transmitted/received power. The mmWave system may runs an exhaustive beam search in the idle time in order to feed and improve the algorithm that maps a beam to a reconfigurable antenna state. The mmWave and the 3.5 GHz systems may be simulated using ray tracing for performance evaluation. This section describes each individual component before it covers the simulation of the overall integrated system.

4.1 IEEE 802.11ad Beamforming

Standardization efforts have already recognized the importance of dealing with the overhead of exhaustive beam scanning in the enormous beamforming codebooks of mmWave massive antenna arrays.

The IEEE 802.11ad standard proposes a multi-phase beamforming procedure that includes sector level sweep (SLS) phase for coarse estimation of the AoA among a small number of sectors. The optimal sector of the SLS phase allows establishing a low-rate communication link. This phase is followed by a beam refining phase for selecting the beam of optimal gain within the beams that are covered by the optimal sector. The proposed method can fit within the IEEE 802.11ad standard by replacing the SLS phase. IEEE 802.11ad did not propose a specific codebook for implementing the multi-phase beamforming technique.

4.2 Codebook Design

If both transmitter and receiver have complete knowledge about channel state information (CSI), then they may apply high resolution phase shifting to achieve the optimal beam to communicate and update the AWV as the CSI changes to maintain an optimal communication link. Capturing and updating the CSI for a MIMO system in addition to a hardware implementation that supports high resolution phase shifting may result in a continuum of feasible vectors that renders such solution impractical. The practical solution uses quantum phase shift values with a set of AWVs that comprise a codebook that achieves optimal beamforming and can be scanned within the coherence time of the temporally varying mmWave channel. Designing the vectors of the codebook and scanning all the AWVs of the codebook is a huge overhead that researchers are working to reduce.

This system does not suggest a codebook design but uses the last layer of a codebook to generate the AWVs for a ULA and proposes an alternative out-band sub-6 GHz reconfigurable antenna system functioning in parallel to the mmWave communication to reduce the beam search space. Such an approach may be applied to any codebook design.

4.3 Reconfigurable Antennas

Reconfigurable antennas are capable of generating various radiation patterns through modification of the electrical structure of the antenna. The system herein may use simulated antennas that are capable of reconfiguring their pattern to capture the spatial signature of the communicating devices through electrical switching. This assumes that the 3.5 GHz module has its optimal state selection algorithm to switch between the reconfigurable antenna patterns as the devices move or the channel changes. Other art describes an adaptive algorithm for state selection.

Figure 4:
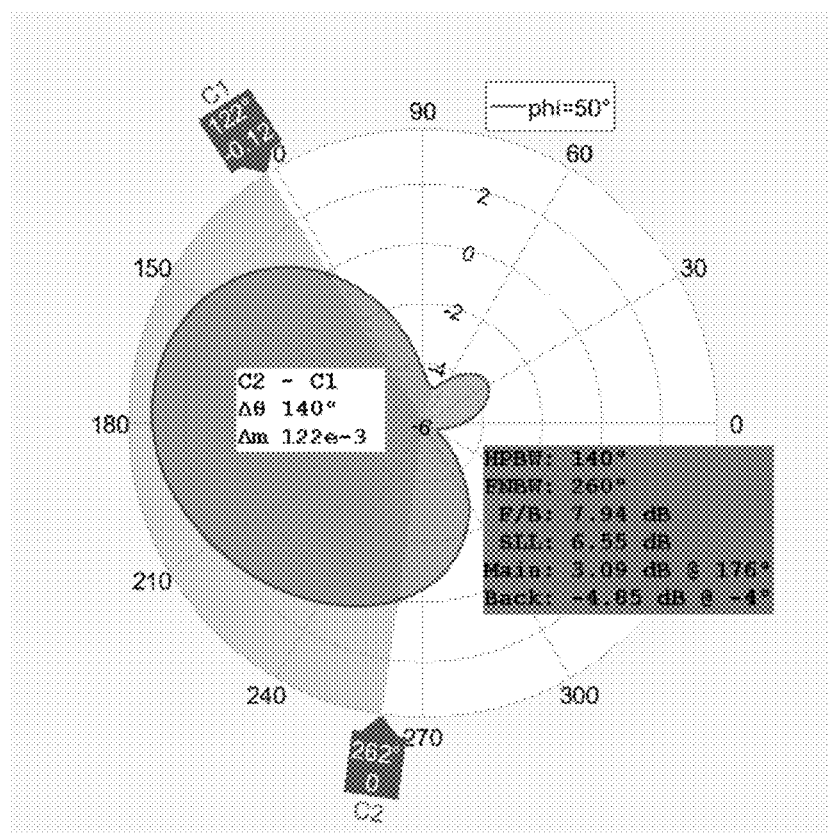
FIG. 4 shows a 2D slice of the pattern of one of the reconfigurable antenna states.

The Alford loop reconfigurable antenna used in a system made according to this disclosure comprises four arms with integrated electrical switching with possible use of combination of arms enabled to generate more antenna patterns (states) to increase the degrees of freedom and resolution of the spatial signature. FIG. 4 shows a 2D slice of the antenna pattern when only a single arm is enabled. State switching may cause this pattern to rotate depending on which arm is selected.

5 Simulation Setup

5.1 Ray Tracing

A number of research works have simulated electromagnetic propagation in indoor and outdoor environments using the RemcomWireless InSite ray tracing tool. Some researchers have validated using the tool at 60 GHz through contrasting measurements, calculations, and simulation data.

Figure 3:
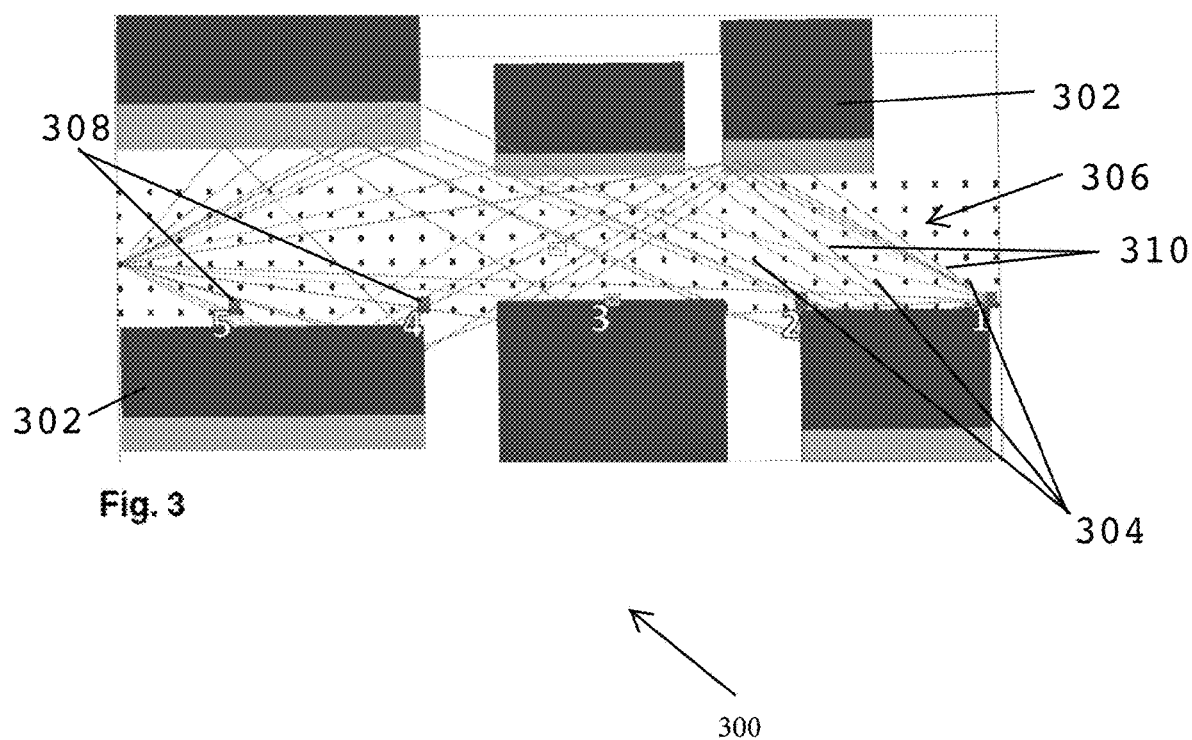
FIG. 3 shows a street 3D model of the Wireless InSite ray tracing simulation model.
Figures 15, 16:
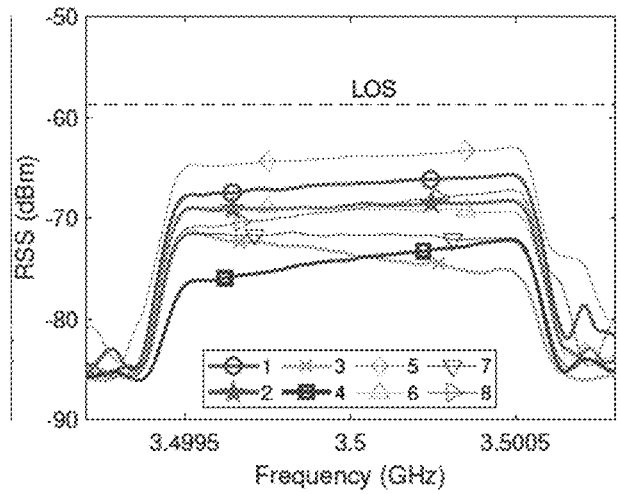
FIG. 15 shows Table 1.
FIG. 16 shows Table 2.

This simulation uses Wireless InSite to collect site-specific complex channel impulse responses for point to point multipath propagation. The simulated environment layout is depicted in FIG. 3 and the simulator parameters are shown in Table 1 (FIG. 15). The buildings in the simulation environment are constructed of concrete walls and brick roofs as described in Table 2 (FIG. 16). In FIG. 3, the Street 3D model of the Wireless InSite ray tracing simulation model 300 depicts randomly placed buildings 302 placed at the sides a street 306. The street 306 has multiple lanes. The red points 304 are the RX locations. The numbered green points 308 are the transmitters TX1-TX5 from right to left. The green lines 310 are potential signal paths.

The simulation output returns the strongest 25 paths for every TX-RX combination, where TX is the BS or the road side unit (RSU) and RX is the mobile unit (MU). This simulation uses the Shooting and Bouncing Ray (SBR) method of the Full 3D model. The paths 310 include TX-RX direct paths and paths that have up to 3 reflections and diffractions from TX to RX. Post processing of the simulation output is explained in Section 5.3 where a ULA structure is applied to generate the channel matrix.

5.2 Reconfigurable Antenna State Selection

The ray tracing simulation runs for four possible patterns that result from different states of the switches of the reconfigurable antenna. The actual implementation of the reconfigurable antenna uses PIN diodes to switch between patterns. FIG. 4 shows one of the patterns of the antenna that is used at every TX and RX point. Different patterns are loaded to the simulation application. To visualize the state selection process, the inventors use the RX point X-Y coordinates in FIG. 3 and mapped it into a rectangle of a color corresponds to the state selected. The state colors are shown in the colorbar of the figures throughout this disclosure. State selection is performed in post processing.

Figure 5:
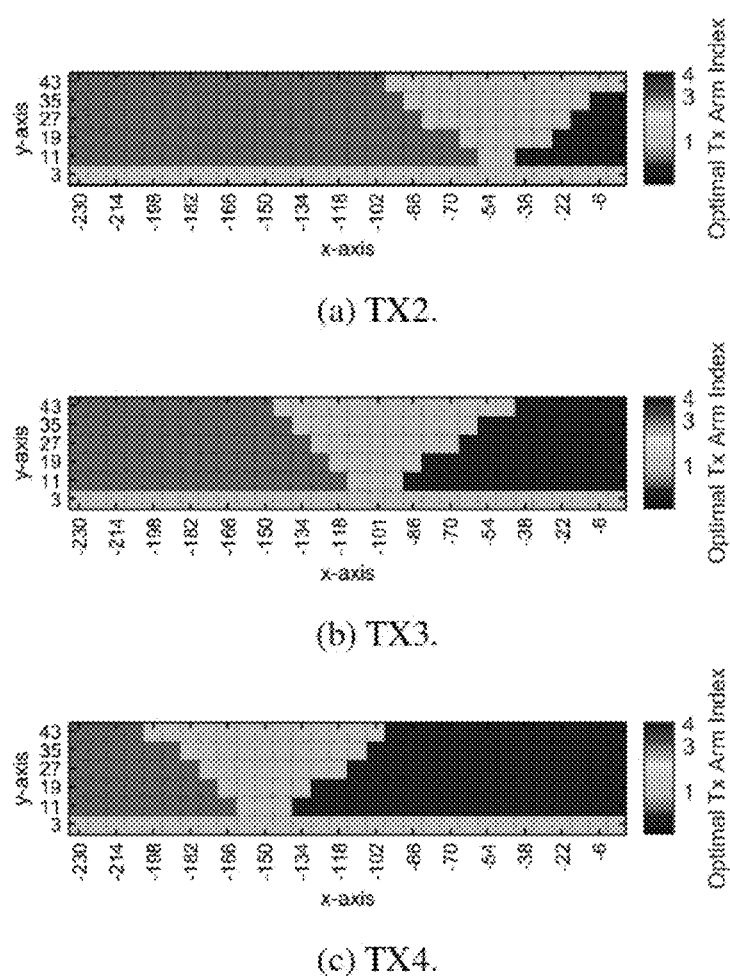
FIG. 5 shows a reconfigurable antenna pattern (arm) selection at the transmitter side for different positions of the RSU (TX).

FIG. 5 shows the optimal arm (state) selection for the reconfigurable antenna at every RX point in FIG. 3. The simulation runs for every TX point independently in order to have multiple snapshots of the data and to see how arm selection works at different base stations. Results match the expectations where every RX point can be served best with one of the four patterns at the TX point location.

5.3 Channel Matrix Calculation

This section builds on the channel matrix formulation in art that combines ray tracing output with a geometric channel model. For every TX, RX combination, the ray tracing system described in Section 5.1 returns for each propagation path: received power, delay, phase, Angle of Arrival (AoA), and Angle of Departure (AoD).

Using this information, the channel matrix for time sample n is given by:

$$H[n] = \sqrt{N_r N_t} \sum_{\ell=0}^{L_p-1} \alpha_\ell g(nT - \mathcal{T}_\ell) a_r(\varphi_\ell^A) a_t^*(\varphi_\ell^D). \quad (1)$$

where $(\cdot)^*$ is the conjugate, Nt, Nr the numbers of transmit and receive antenna array elements respectively, Lp the number of rays (25 paths), $\alpha_l$ the complex channel gain, $t_l$ the delay, $\varphi_l^A$ the AoA, $\varphi_l^D$ the AoD of the l-th ray, $g(\cdot)$ is the combined effect of low-pass filtering and pulse shaping, B the system bandwidth, T=1/B the symbol period, and ar(·) and at(·) the receive and transmit steering vectors which are calculated from the use of a ULA as:

$$a(\varphi) = \frac{1}{\sqrt{N}} [1, e^{j\Omega}, \ldots, e^{j(N-1)\Omega}], \quad [1a]$$

where $\Omega = kd\cos(\varphi)$, $k=2\pi/\lambda$ is the wave number, N the number of antenna array elements of the ULA, and d is the ULA element spacing. In this paper, $d=\lambda/2$.

Figure 6:
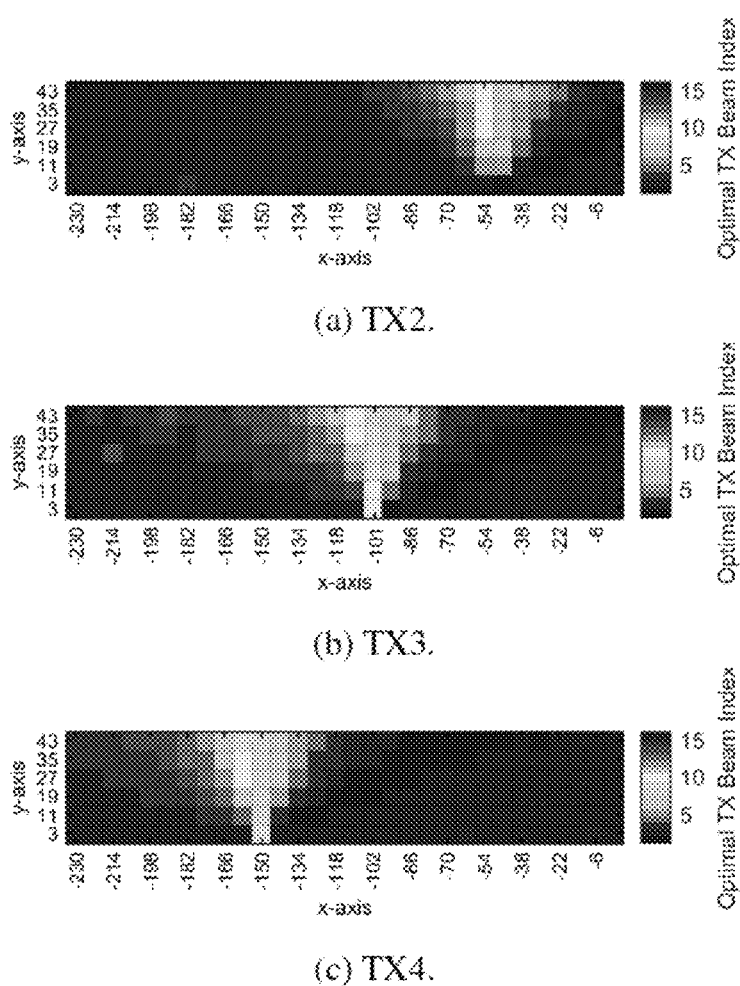
FIG. 6 shows ULA beam selection at the transmitter side for 5 different positions of the RSU. The colors and indices represent the selected beam index from the codebook. This figure depicts the results of 16 element ULA.
Figure 7:
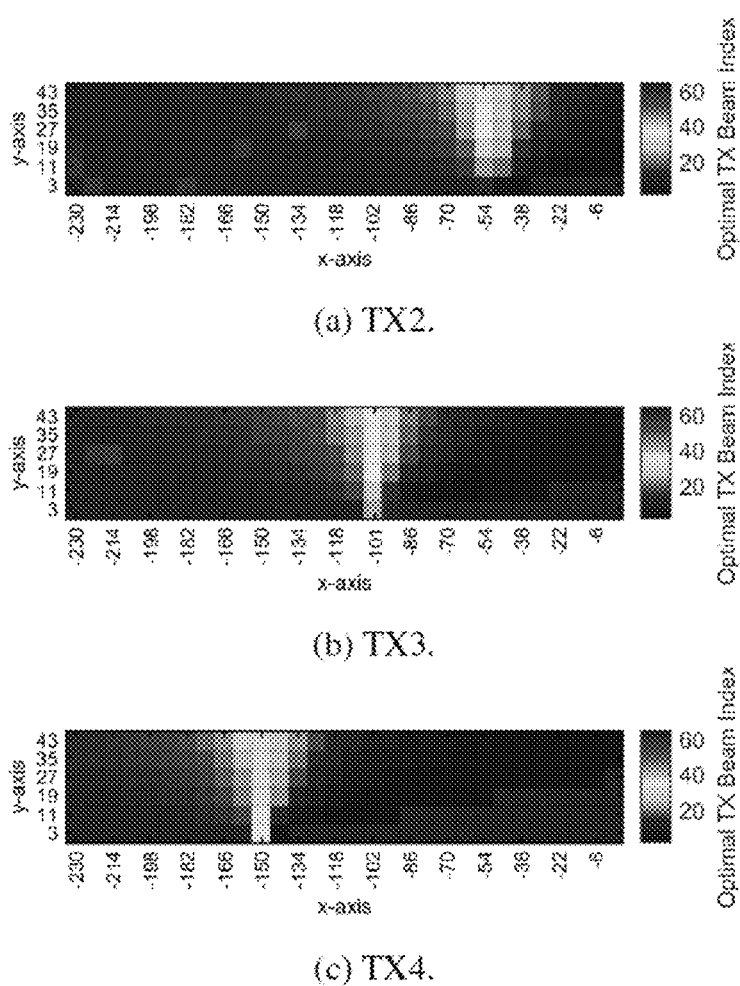
FIG. 7: shows ULA beam selection at the transmitter side for different positions of the RSU (TX). The colors and indices represent the selected beam index from the codebook. This figure depicts the results of 64 element ULA.

5.4 mmWave Beam Selection mmWave beam selection runs exhaustively by iterating over all the beams of the codebook at both TX and RX to achieve:

$$\arg\max_{i,j} \sqrt{N_t N_r}\, w_i^H H f_j, \quad (2)$$

where wi is the ith beam of the TX codebook, and fj is the jth beam of the RX codebook. The maximum received power occurs at the optimal beam alignment at both TX and RX. FIG. 6 shows the beam index selected at the TX side for communicating with every RX point of the grid through a 16 element ULA at both TX and RX. Each beam index is assigned a number. The colorbar of the figure is used to map colors to the various beam indices. FIG. 6 shows the exhaustive beam selection process for various TX positions of the setup in FIG. 3. FIG. 7 shows the beam alignment for a 64 element ULA.

6 Results and Analysis

Figure 8:
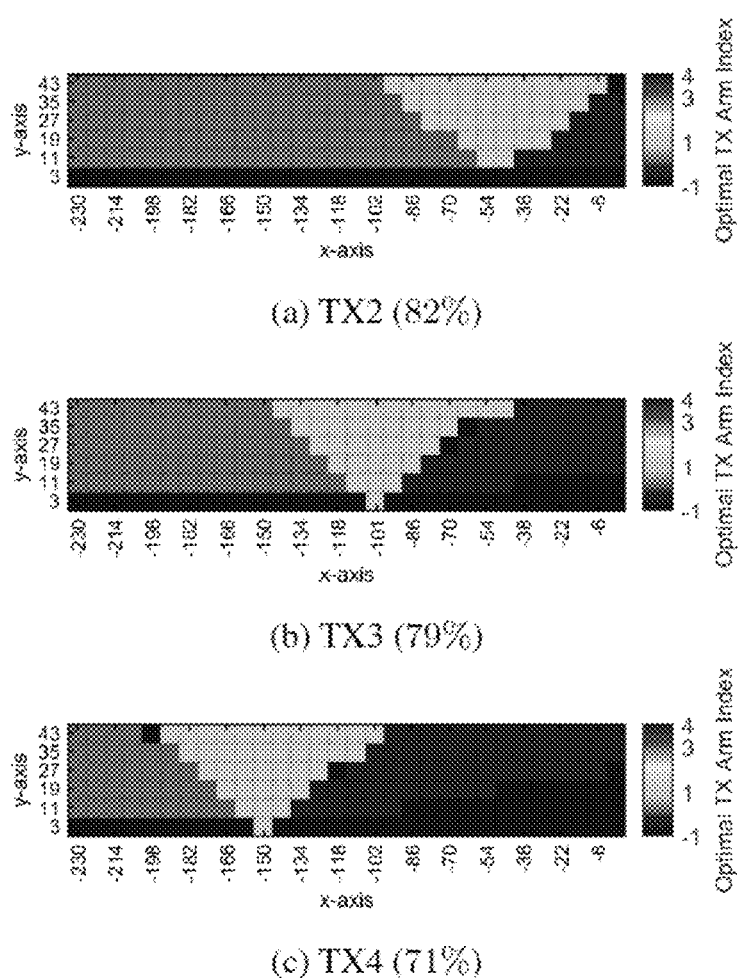
FIG. 8 shows ULA beam selection at the transmitter side for 3 different positions of the RSU. The colors and indices represent the arm that corresponds to the beam index from the codebook. This figure depicts the results of 64 element ULA. index 1 represents those beams that were not be able to guess based on the arm information.

The connection between state selection and beam selection is used to evaluate the performance of the technique proposed. First, for each TX point the analysis retrieves the ground truth results for the optimal beam and state based on the exhaustive scanning results. Then, the analysis assigns every beam index to the most likely state based on the number of occurrences. The output of this process is a map between beams and states. In case of uncertainty where a beam occurs in more than one state, it can be assign to the more likely state. This coarse mapping that accompanies the lack of certainty results in errors of the beam-state assignment. FIG. 8 depicts the state-beam assignment process. FIG. 8 iterates over each RX point in the RX grid for a specific TX point and compares the ground truth state and the state corresponding to the beam-assignment map.

If the estimated state is equal to the actual state then it can be assigned assign the state index to this RX point, if not, the analysis assigns the index −1 to show that the mapping is not successful for this particular RX point. The resulting figure shows the areas where selecting the beam using reconfigurable antenna state is successful and the areas that are not. Each RX point in the figure is a rectangle corresponds to the X-Y coordinates of the RX grid in FIG. 3. The indices numbers are mapped to different colors in the colorbar of the figure. The inventors can apply this mapping to different TX points and show the percentage of success for the 64 antenna element ULA scenario. Results show that the success rate was more than 71% in the worst case and 82% in the best case. The success rate varies according to the placement of the TX (BS) in reference to the moving RX (mobile users). However, the success rate is robust to support a low overhead mmWave beamforming system.

Figure 9:
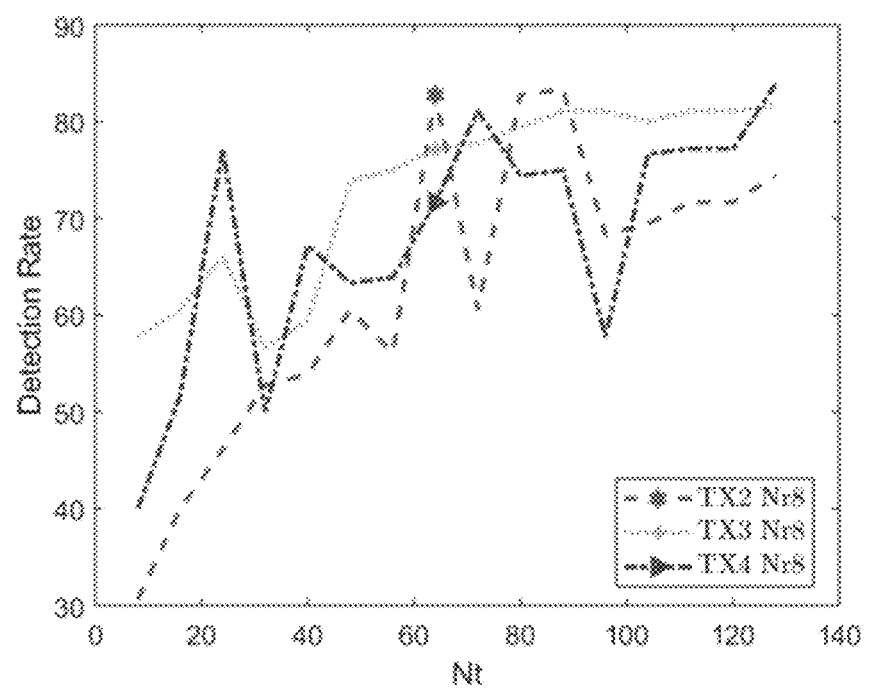
FIG. 9 shows detection rate is the percentage probability of a beam being actually covered by the arm that correlates to it in the simulation data. This figure shows that the detection rate increases as the number of antenna elements in the antenna array and consequently the number of beams in the codebook increases.

To analyze the effect of the antenna array size on the selection results the analysis plots the success rate for various antenna array sizes at the TX while the RX antenna array is fixed to 8 elements. FIG. 9 shows the results for TX points 2 to 4. The results show that the mapping can be better captured with growing number of antenna elements. This shows that as the antenna array has higher resolution beams they match better with the spatial signature captured by the reconfigurable antenna states.

The promise of reducing the overhead of mmWave beamforming through the out-band reconfigurable antenna state exploitation is the core of this work. In order to evaluate this, the analysis needs to define the complexity of the system and how to evaluate it. The highest complexity is to default to an exhaustive search of all beams of the mmWave codebook. In this disclosure, given the optimal reconfigurable antenna state, only a subset of code words which correspond to the selected state need to be scanned. Each code word may have a weight which depends on how often it is matched with a particular state.

Complexity can vary by deciding the threshold of which beams to evaluate for the given state. If we decide to lower the threshold then we fall into the exhaustive search again with highest complexity. If we increase the threshold then we decrease the complexity on the cost of evaluating a set of beams that might not include the optimal beam. For different antenna array configurations the inventors calculated the average complexity normalized to the exhaustive search complexity.

Figure 10:
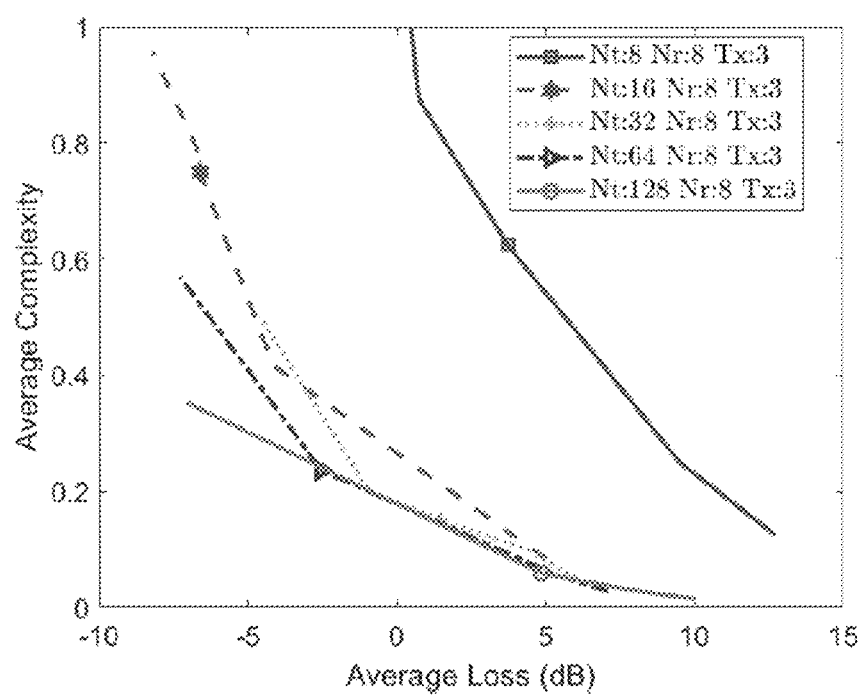
FIG. 10 shows the complexity as a percentage of the exhaustive search versus the loss (exhaustive gain-gain of the proposed technique).

The analysis can plot the result along with the loss that is caused by the proposed technique. The loss may be defined as the difference in gain between the exhaustive scanning gain and the reconfigurable antenna aided beam selection gain. It is obvious that there is a trade-off between the complexity and the loss which can be selected according to the application parameters. FIG. 10 depicts this trade-off for TX3 point for various antenna configurations.

Figure 11A:
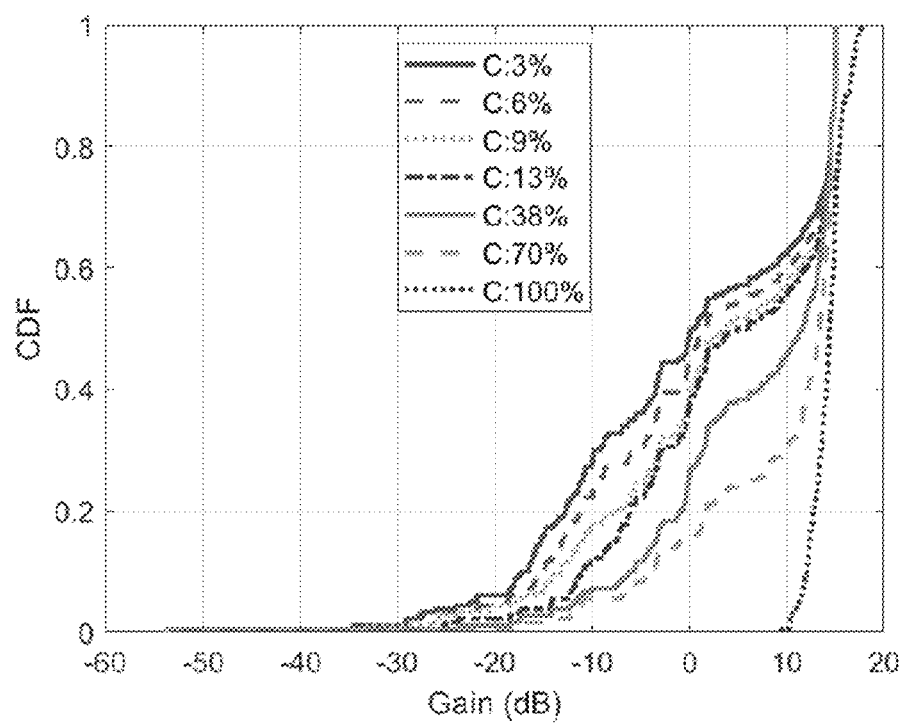
FIGS. 11a and 11b show CDF of the gain of the proposed technique for various complexity choices (C) along with the exhaustive search method.
Figure 11B:
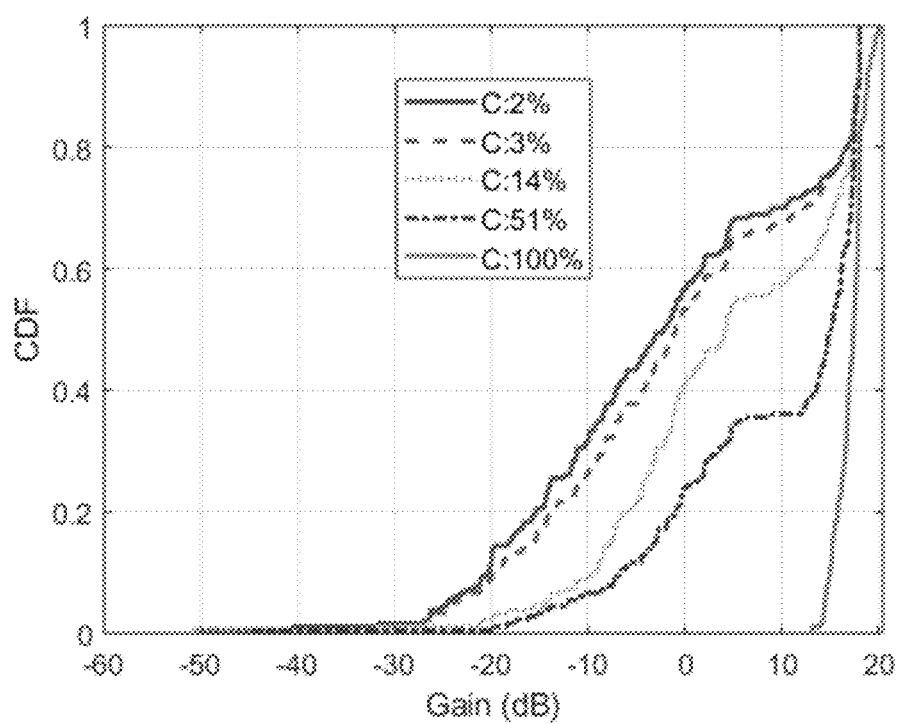

FIGS. 11(a) and (b) depict the gain cumulative distribution function (CDF) for TX3 point for a couple of ULA antenna configurations. Obviously, the gain is less than the exhaustive case. However, at a decent complexity of less than 40% of the exhaustive scanning cost, we can successfully get more than 60% of the points to communicate at relatively high gain. The results of this analysis and result are promising for a low-cost practical implementation for a mmWave beamforming platform.

Figure 12:
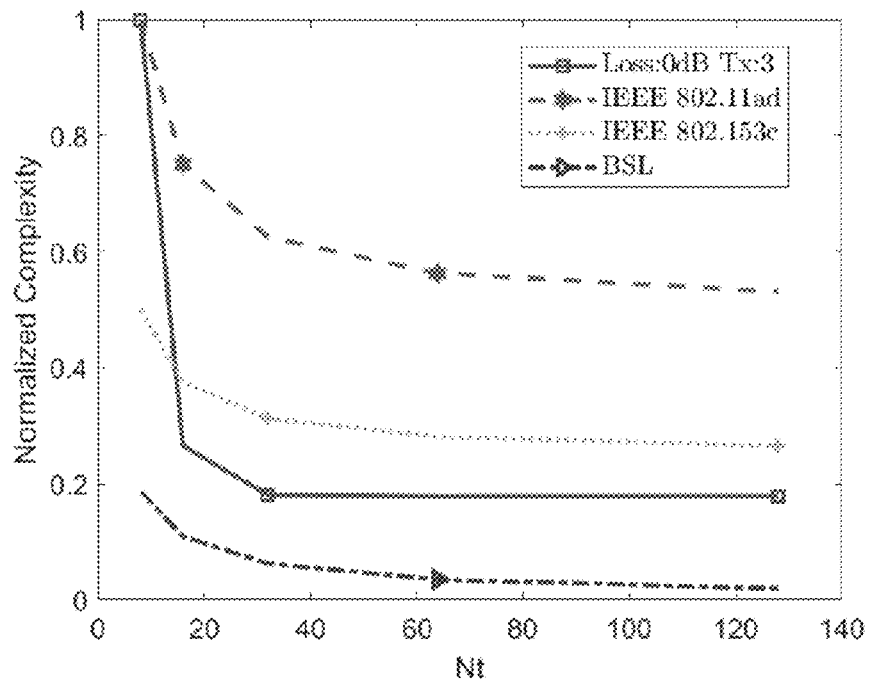
FIG. 12 shows normalized complexity comparison between the proposed technique and other techniques. Nr was fixed at 8.

FIG. 12 compares the complexity of the proposed technique and other work techniques. The shown complexity is normalized to the exhaustive search complexity which is O(N2). The proposed technique values are taken from FIG. 10 at 0 dB loss and the calculated values for other methods are taken from the work in earlier works. The legend value BSL corresponds to other prior art. The calculations assumed a 4-sector system to resemble the proposed solution simulation which uses a 4-state reconfigurable antenna. The disclosed technique shows competing complexity reduction performance despite the simplicity and low cost resulted from using only a single RF chain low frequency system with a reconfigurable antenna. Table 3 (FIG. 17) summarizes the differences among the different beamforming solutions and the proposed solution.

7 Blockage Detection Insights

The envisioned integrated system uses mmWave frequencies for high data rate communication and sub-6 GHz frequencies for both: 1) beamforming support information and 2) default low data rate communication in case of outage at mmWave frequencies. However, it is still of great importance for the integrated system to detect a mmWave blocked link where the sub-6 GHz support information cannot help the beamforming system to select an optimal beam (i.e. all codebook beams are blocked). This section assumes that NLOS communication at mmWave frequencies is not possible due to high attenuation and therefore an LOS propagation is necessary at mmWave frequencies. The integrated system benefits from the knowledge of whether the link is LOS or NLOS. NLOS can trigger: a) standalone mmWave beamforming b) handover to another BS c) using sub-6 GHz as a default communication system. On the other hand an LOS flag may urge the integrated system to keep using mmWave communication with sub-6 GHz support information.

Figure 13:
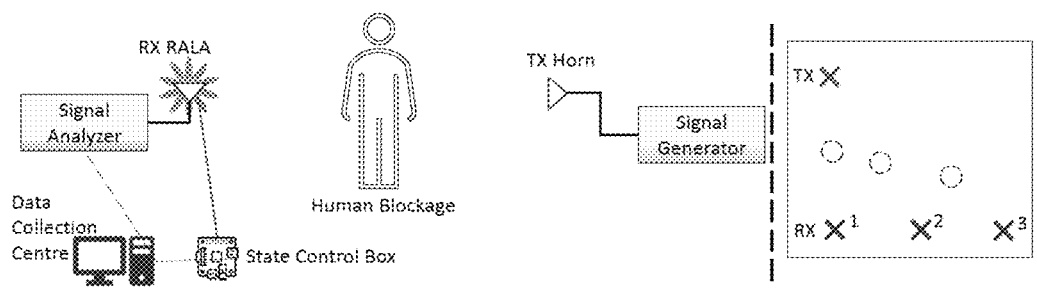
FIG. 13 shows the human blockage experiment setup. The dashed circles represent the position of human blockage which was 5 ft from the receiver. Signal Generator sweeps 1 MHz of frequency centered at 3.5 GHz.

The sub-6 GHz RALA used in the system provides helpful information that can be used to detect LOS connection. The inventors ran an indoor experiment as shown in FIG. 13 where LOS and blocked RSS measurements were taken. In order to show how consecutive data measurements using the sub-6 GHz system can be used to detect blockage, the inventors set the positions of the TX and RX as shown in the right box of FIG. 13. For each RX position, the inventors take LOS measurements and blocked measurements. The blockage is a human body standing 5 ft from the RX. FIGS. 14(a)-(f) shows the corresponding measurements where each number in the legend corresponds to the activated RALA pattern while taking RSS measurements.

As the RX moves from RX1 to RX2, and to RX3, the pattern selection was reasonable and corresponds to a slight change in orientation, i.e. 9 state is enabled first and then 13 state was enabled.

This change reflects the actual change in alignment between the TX and the RX. The RSS change was relatively small. However, when a blockage was introduced in the three RX locations, the blockage is represented by a dashed circle in FIG. 13. The inventors have two observations from these experiments: 1) RSS attenuation is relatively high, and 2) The optimal direction no longer represents the actual orientation or a slightly changing orientation. It was completely random and actually points to the opposite direction of TX with multiple patterns having the same RSS. These two features can be used to detect a blockage which helps the mmWave beamforming system to make a decision.

8 Conclusion

This disclosure proposes the use of reconfigurable antennas at 3.5 GHz to aid beamforming at mmWave frequencies for future Gbps communication systems. This builds on the correlation of the spatial signature of wireless propagation at both mmWave frequencies and sub-6 GHz frequencies to reduce the beam search space of the mmWave beamforming codebook. This practical solution that works in parallel to the mmWave system and uses only single RF chain is a and promising technique to tackle the crucial obstacle in mmWave communication which is the overhead of scanning the beamforming codebook for the optimal AWV. This disclosure uses ray tracing simulation to evaluate the performance of proposed beam scanning in terms of robustness, gain, and reduced complexity for different ULA sizes. The results are promising and renders mmWave mobile networks practical. This is the first to introduce aiding mmWave systems with reconfigurable antennas at low frequencies and opens new venues for research, for example, it can be used to improve the mmWave coverage and alleviate handgrip blockage for mmWave handsets which can have multiple antenna arrays where the reconfigurable antenna state aids selecting the optimal antenna array before applying further beamforming for data transmission. The inventors envision a future system that uses a combination of the proposed method and other methods to cover all possible scenarios of beamforming at mmWave frequencies.

While the invention has been described with reference to the embodiments, a person of ordinary skill in the art would understand that various changes or modifications may be made thereto without departing from the scope of the claims.

The invention claimed is:
1. A system for low latency beamforming at mmWave frequencies, comprising:
  a mmWave communication module that uses a phased antenna array and applies codebook-based analog beamforming for spatial beam scanning; and
  a sub-6 GHz reconfigurable antenna module for coarse beamforming, wherein the sub-6 GHz reconfigurable antenna module:
    iterates over states of a Reconfigurable Alford Loop Antenna (RALA) that is equipped with a state control circuit to select a reconfigurable antenna state; and
    provides a beam pattern to the mmWave communication module,
  wherein the mmWave communication module:
    shortlists beam codes based on the beam pattern;

iterates over the short-listed beam codes using a phased antenna control circuit; and communicates, using a beam, based on the iteration over the short-listed beam codes.

2. The system of claim 1, wherein the sub-6 GHZ reconfigurable antenna module operates at 3.5 GHz.

3. The system of claim 1, wherein the sub-6 GHz reconfigurable antenna module runs a state selection algorithm using state scanning and makes result available to the mmWave communication module as the reconfigurable antenna state.

4. The system of claim 3, wherein the reconfigurable antenna state is the selected beam pattern for communication at a particular time.

5. The system of claim 4, wherein the mmWave communication module runs a beam search in idle time in order to feed and improve a correlation algorithm that maps the beam to the reconfigurable antenna state of the sub-6 GHz reconfigurable antenna module.

6. The system of claim 1, wherein coarse beamforming is done by a system that uses different resources from those used by the mmWave communication module.

7. The system of claim 6, wherein the system is compatible with new radio (NR) spectrum allocations that operate in a 3.5 GHz frequency band.

8. The system of claim 6, wherein the system is compatible with new radio (NR) spectrum allocations that operate in a 60 GHz frequency band.

9. The system of claim 1, wherein the provided beam pattern is a beam pattern selected based on the reconfigurable antenna state.

10. A low latency low complexity mmWave beamforming system, comprising:

a sub-6 GHz reconfigurable antenna module for coarse beamforming, wherein the sub-6 GHz reconfigurable antenna module uses a Reconfigurable Alford Loop Antenna (RALA) that has an integrated control circuit to switch between different antenna patterns to identify a coarse direction of communication and communicates coarse data to a main module, wherein the main module is a mmWave communication module that: uses a phased antenna array, performs analog beamforming using a beamforming codebook, and uses the coarse data to identify shortlisted beams from the beamforming codebook for communication.

11. The system of claim 10, wherein the sub-6 GHZ reconfigurable antenna module operates at 3.5 GHz.

12. The system of claim 10, wherein the sub-6 GHz reconfigurable antenna module runs a state selection algorithm using state scanning and makes result available to the mmWave communication module as a reconfigurable antenna state.

13. The system of claim 12, wherein the reconfigurable antenna state is a selected beam pattern for communication at a particular time.

14. The system of claim 13, wherein the mmWave communication module runs a beam search in idle time in order to feed and improve a correlation algorithm that maps the beam to the reconfigurable antenna state of the sub-6 GHZ reconfigurable antenna module.

15. The system of claim 10, wherein coarse beamforming is done by a system that uses different resources from those used by the mmWave communication module.

16. The system of claim 10, wherein the low latency low complexity mmWave beamforming system is compatible with new radio (NR) spectrum allocations that operate in a 3.5 GHz frequency band.

17. The system of claim 10, wherein the low latency low complexity mmWave beamforming system is compatible with new radio (NR) spectrum allocations that operate in a 60 GHz frequency band.

* * * * *